(12) United States Patent
Verma

(10) Patent No.: US 7,628,197 B2
(45) Date of Patent: Dec. 8, 2009

(54) WATER QUENCH FITTING FOR PYROLYSIS FURNACE EFFLUENT

(75) Inventor: Vijender Kumar Verma, Sugar Land, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 354 days.

(21) Appl. No.: 11/639,612

(22) Filed: Dec. 16, 2006

(65) Prior Publication Data

US 2008/0146857 A1     Jun. 19, 2008

(51) Int. Cl.
*C07C 1/00* (2006.01)
(52) U.S. Cl. .................. 165/60; 585/910; 585/911; 585/914; 261/76; 261/94; 261/115
(58) Field of Classification Search ............... 585/324, 585/910–911, 914; 261/75–126
See application file for complete search history.

(56) References Cited

U.S. PATENT DOCUMENTS 3,498,906 A * 3/1970 Bogart et al. ............... 208/50

| 5,092,981 A | 3/1992 | Russo |
| 6,013,852 A | 1/2000 | Chandrasekharan et al. |
| 2004/0152939 A1* | 8/2004 | Pettigrew et al. ............ 585/809 |

FOREIGN PATENT DOCUMENTS

WO      WO 93/12200     * 6/1993

* cited by examiner

*Primary Examiner*—Robert J Hill, Jr.
*Assistant Examiner*—Brian McCaig

(57) ABSTRACT

Apparatus and processes for quenching a pyrolysis furnace effluent are provided. In one embodiment, a hydrocarbon stream comprising gas and oil vapor can be quenched with a first quench water stream to form a mixed vapor-liquid stream. The mixed vapor-liquid stream can be fed to a water quench tower to separate the vapor and liquid. The separated vapor can be further quenched with a second quench water stream in the quench tower to form an overhead vapor product comprising light hydrocarbons. Water and liquid hydrocarbons can be collected from the quench tower in an oil-water separator. The liquid hydrocarbons can be recovered from the oil-water separator. Water can be recovered from the oil-water separator. A portion of the recovered water can be cooled. The cooled water can be recycled to the first and second quench water streams.

20 Claims, 2 Drawing Sheets

WATER QUENCH FITTING FOR PYROLYSIS FURNACE EFFLUENT

FIELD

The embodiments relate generally to the water quenching of pyrolysis furnace effluent, and more particularly to partially water quenching the effluent upstream from the water quench tower inlet.

BACKGROUND

Low molecular weight hydrocarbons and olefins can be produced in a pyrolysis furnace which provides heat sufficient to break chemical bonds in higher molecular weight hydrocarbons. The hydrocarbon feedstock to be cracked in a pyrolysis furnace usually consists of hydrocarbon gases such as ethane, propane, butane, or hydrocarbon liquids such as naphtha, kerosene, gas oil, or other available hydrocarbon feedstock. Hydrocarbon products produced when cracking gas feeds can include olefins such as ethylene and propylene, coke, and gasoline range hydrocarbons (C5+). Hydrocarbon products produced when cracking liquid feeds and heavier feedstocks can also include light and mid-range hydrocarbons, as well as coke and other heavy oils. To help control the cracking process, steam is typically used to dilute the feedstock hydrocarbon in the pyrolysis furnace; the amount of steam used can be characterized by the ratio of steam to total hydrocarbon fed to the pyrolysis furnace, hereinafter referred to as the steam to hydrocarbon weight ratio. After the cracking reaction, the resulting pyrolysis furnace effluent is typically cooled through indirect heat exchange to produce high pressure steam, and can also undergo a second indirect heat exchange to produce medium or low pressure steam, or other methods of heat recovery.

Typical downstream processing for cracked ethane/propane feed includes a water quench tower to cool the cracked gases and to condense and separate the dilution steam and gasoline from the lighter hydrocarbons. Typical downstream processing for cracked naphtha or other liquid hydrocarbon feedstock can also include a fractionator to separate the heavy and mid-range hydrocarbons from the steam, gasoline, and light-end hydrocarbons, upstream from the water quench tower. The water quench towers are also used as a source of low level heat to supply hot water for process heating.

One example of the downstream processing of effluent from a hydrocarbon cracker includes a steam diluted cracker effluent immediately cooled to a temperature below 650° C. (1200° F.), sufficient to stop the cracking reaction, through direct heat exchange with water, steam, or oil introduced through a primary ejector. One or more indirect heat exchangers are then used to recover heat and to produce high, medium, or low pressure steam prior to feeding the effluent to a fractionation tower or a quench tower. A secondary ejector is also disclosed, which can be used to cool the process stream to the desired fractionation tower or quench tower inlet temperature downstream of the indirect heat exchangers.

Another second example of the downstream processing of effluent from a hydrocarbon cracker includes a steam diluted cracker effluent cooled by direct and indirect heat exchange upstream of a fractionation tower. The overhead vapor product from the fractionation tower is then fed directly to a water quench tower to separate gasoline range hydrocarbons from ethylene and propylene.

Due to the conventional design of the water quench process, existing water quench towers are capacity-limited. A need exists to increase the capacity of new or existing water quench towers.

BRIEF DESCRIPTION OF THE DRAWINGS

The detailed description will be better understood in conjunction with the accompanying drawings as follows.

Figure 1:
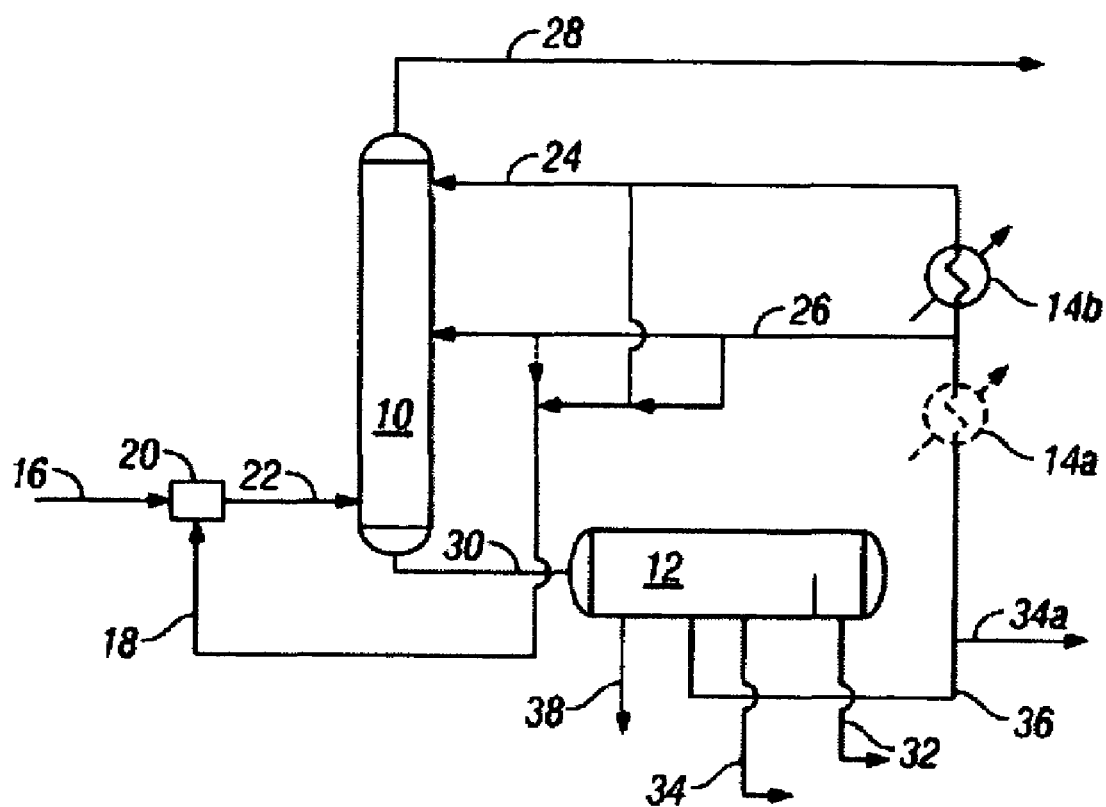
FIG. 1 depicts a simplified schematic illustration of a process for water quenching a pyrolysis furnace effluent according to one embodiment.

The embodiments are detailed below with reference to the listed Figures.

DETAILED DESCRIPTION OF THE EMBODIMENTS

Before explaining the embodiments in detail, it is to be understood that the embodiments are not limited to the particular embodiments and that they can be practiced or carried out in various ways.

The embodiments relate to designs of the water quench operation, providing the benefits of increased capacity for existing water quench towers or decreased design diameter for new water quench towers, with a corresponding benefit of decreasing the required capital investment, and improves the versatility of the water quench process such that a wider variety of feedstock hydrocarbons can be fed to the pyrolysis furnace. A one or more catalytic converters can be used instead of one or more pyrolysis furnaces.

The embodiments relate to processes for water quenching a pyrolysis furnace effluent. The pyrolysis furnace effluent can be a stream of mixed hydrocarbon vapors and steam. The pyrolysis furnace effluent can be partially quenched in one or more stages using at least a first quench water stream to form a mixed vapor-liquid stream. The mixed phase stream can then be fed to a water quench tower to separate the vapor and liquid. The vapor can be further quenched with a second quench water stream supplied by one or more lines at various locations in the quench tower to form an overhead water-lean vapor product stream enriched in light hydrocarbons. Quenching can result in condensing a portion of the hydrocarbons and at least a portion of the steam, and the condensate can be collected in an oil-water separator. The liquid hydrocarbon and water can be recovered from the oil-water separator, and a portion of the recovered water (with or without some oil) can be cooled and recycled to the first and second quench water streams.

The recovered water recycled to the first and second quench water streams can be cooled by one or more heat exchangers, in series or in parallel flow configurations.

The partially quenched hydrocarbon stream can be fed to a liquid collection zone of the water quench tower at a location below the lowest vapor-liquid contact surface to facilitate efficient quench tower operation.

The pyrolysis furnace effluent can have a steam to hydrocarbon feed weight ratio known in the art, in one embodiment between about 0.2 and about 1.0, or in another embodiment between 0.2 and 0.7. The pyrolysis furnace effluent can be effluent from a gas cracker used for the production of olefins, and in one embodiment can have a steam to hydrocarbon weight ratio from about 0.2 to about 0.4. The pyrolysis furnace effluent from a gas cracker can be cooled in the partial quench from a temperature greater than 175° C., for example about 250° C., to a temperature between about 65° C. and 115° C. In another embodiment, the pyrolysis furnace effluent from a gas cracker can be cooled in the partial quench to a temperature between about 80° C. and 100° C.

The water quench tower can operate at a pressure of between about 0.1 MPa and about 0.5 MPa. In another embodiment, the water quench tower can be operated at a pressure of between about 0.15 MPa and about 0.4 MPa.

The pyrolysis furnace effluent can comprise a cracked liquid hydrocarbon, such as cracked naphtha, having steam to hydrocarbon weight ratios between about 0.4 and about 0.6 in one embodiment, or cracked kerosene, having steam to hydrocarbon weight ratios between about 0.5 and about 0.7 in another embodiment. In another embodiment of the invention, the pyrolysis furnace effluent can be fractionated upstream of the partial water quenching. The pyrolysis furnace effluent can be fed to a fractionation tower, where the effluent can be quenched and fractionated with a first quench oil stream (and gasoline reflux) to form the steam and hydrocarbon vapor stream for the partial water quenching described above. Liquid hydrocarbons can be collected from the fractionation tower. A first portion of the collected liquid hydrocarbons can be recovered as a product. A second portion of the collected liquid hydrocarbons can be cooled and recycled for use in the first quench oil stream. The pyrolysis furnace effluent can be partially quenched using a second hydrocarbon quench stream prior to the fractionation tower. In one embodiment, the pyrolysis furnace effluent can be partially quenched with oil at a temperature from about 350° C. to about 850° C., or from about 350° C. to about 550° C., to a temperature from about 170° C. to about 400° C. or from about 200° C. to about 300° C. In another embodiment, the pyrolysis furnace effluent can be partially quenched with oil to a temperature between about 235° C. to about 265° C. The second portion of the collected liquid hydrocarbon can be cooled and recycled to form the first and second quench oil streams. In one embodiment, the cooling of the collected liquid hydrocarbon can include indirect heat exchange. The process can include refluxing the fractionation tower with hydrocarbon recovered from the oil-water separator.

Embodiments relate to apparatus for water quenching a pyrolysis furnace effluent of gas and oil vapor. The apparatus can include means for partially quenching the pyrolysis furnace effluent with a first quench water stream in one or more stages to produce a mixed vapor-liquid stream; means for feeding the mixed vapor-liquid stream to a water quench tower to separate the vapor and liquid; means for further quenching the separated vapor with a second quench water stream in the quench tower to form an overhead vapor product comprising light hydrocarbons; means for collecting water and liquid hydrocarbons from the quench tower in an oil-water separator; means for separately recovering oil and water from the oil-water separator; means for cooling a portion of the recovered water; and, means for recycling the cooled water to the first and second water streams.

Embodiments relate to apparatus for water quenching a pyrolysis furnace effluent. The apparatus includes one or more water quench fittings in a feed line to a water quench tower for partially quenching a hydrocarbon stream comprising gas and oil vapor with a first quench water stream to form a mixed vapor-liquid stream in the feed line; where the hydrocarbon stream can be a furnace effluent or a partially cooled furnace effluent, for example. The water quench tower can include a vapor-liquid contacting zone in between a bottoms liquid collection zone and an overhead vapor outlet. One or more lines are provided for supplying a second quench water stream to the vapor-liquid contacting zone in the quench tower to form an overhead water-lean vapor product enriched in light hydrocarbons and a liquid bottoms product comprising heavier hydrocarbons and water. Another line can be provided to transfer the liquid bottoms product from the quench tower to an oil-water separator. Another line can be provided to recover oil from the oil-water separator. A further line can be provided to recover water from the oil-water separator. The apparatus can include one or more heat exchangers to cool a portion of the recovered water, and lines to recycle the cooled water to the first and second water streams.

The apparatus can include a pyrolysis furnace for supplying the hydrocarbon stream to the water quench fitting. The water quench tower can have an inlet for receiving the mixed vapor-liquid stream from the feed line below a lowermost vapor-liquid contact medium. In an embodiment, the apparatus includes an upstream fractionation unit having a fractionation tower for receiving effluent from the pyrolysis furnace and a first quench oil supply stream to the fractionation tower for quenching vapor to form the hydrocarbon stream to the water quench fitting. The fractionation tower can include a liquid hydrocarbons collection zone and a line can be provided for recovering a first portion of the collected liquid hydrocarbons from the collection zone. A heat exchanger can be provided for cooling a second portion of the collected liquid hydrocarbons from the collection zone, and a line can be included to recycle at least part of the cooled portion from the heat exchanger to the first quench oil stream. An oil quench fitting can be disposed in a feed line to the fractionation tower for partially quenching the effluent with a second quench oil stream. The second quench oil stream can include part of the cooled portion from the oil heat exchanger. The apparatus can include a line for refluxing the fractionation tower with oil from the oil-water separator With reference to the figures, FIG. 1 depicts a simplified schematic illustration of a process for water quenching a pyrolysis furnace effluent according to one embodiment. The processes can have process equipment such as a water quench tower 10, oil-water separator 12, one or more heat exchangers 14a, 14b, and other well known process equipment not shown such as valves, control valves, filters, strainers, cyclones, pumps and the like. Water quench tower 10 contains vapor-liquid contacting elements or devices such as trays, mesh, fixed packing, random packing, liquid spray nozzles, or the like, which allow for contact of a vapor and a liquid in a countercurrent flow. Heat exchangers 14a and 14b can be fin-fan exchangers, shell and tube exchangers, plate exchangers, or other indirect heat exchangers well known in the art. Heat exchangers 14a and 14b can be operated in parallel or series configuration, and can include as many parallel or series multiple- or single-service heat exchangers as are economical for individual plant operations and depending on the services available.

Supply line 16 and quench water line 18 transmit pyrolysis furnace effluent and quench water, respectively, to water quench fitting 20. Water quench fitting 20 can be an injection nozzle, a rotating nozzle, a mixing tee, a static mixer, or other equipment sufficient to adequately mix and transfer heat and mass between vapor and liquid stream to achieve thermal equilibrium at the inlet to the quench tower 10. Line 22 transmits the resulting mixture from the water quench fitting 20 to water quench tower 10. One or more lines such as lines 24 and/or 26 supply cooled water to water quench tower 10 and to quench water line 18. Overhead vapor product line 28 transmits the vapor product from water quench tower 10 and line 30 transmits the liquid product from water quench tower 10 to oil-water separator 12. Lines 32 and 34 allow recovery of hydrocarbons and water from the oil-water separator 12, respectively. Water is recovered from oil-water separator 12 in line 36, which can supply the water to heat exchangers 14a and 14b to cool the fluid passing to lines 24 and 26. Line 34a can be used to recover water from the system, where line 34a recovers a portion of the water from line 36. Lines 36, 24 and/or 26 supply cool water to water quench tower 10 and to quench water line 18; although three supply lines are illustrated, any number of supply lines can be used to effectuate water quench fitting 20 and quench tower 10 operation.

The apparatus as described above can be used in processes for water quenching a pyrolysis furnace effluent. A conventional pyrolysis furnace (not shown) is used to crack a hydrocarbon feed, diluted with steam, to form smaller hydrocarbon molecules according to cracking methods well known to the skilled artisan. The cracked hydrocarbon feed can be partially cooled in one or more indirect heat exchangers (not shown) as is well known in the art, forming pyrolysis furnace effluent in line 16.

Pyrolysis effluent in line 16 can be partially quenched by mixing with a first quench water stream via line 18 in water quench fitting 20 to form a partially quenched stream in line 22. For example, the pyrolysis furnace effluent can be from an ethane/propane gas cracker at a temperature ranging between about 175° C. and about 370° C. The pyrolysis furnace effluent can be cooled to a temperature between about 70° C. and about 115° C. by direct heat exchange with quench water stream 18 in water quench fitting 20. The cooled product from water quench fitting 20, which can be a vapor-liquid mixture, can be fed to water quench tower 10 through line 22. In one embodiment, pyrolysis furnace effluent 16 can be cooled to a temperature between 80° C. and 100° C. by direct heat exchange with quench water via line 18 in water quench fitting 20. The quench water in line 18 can conveniently originate from oil-water separator 12 or an external source.

Partially quenched vapor-liquid stream in line 22 can be fed to a lower end of water quench tower 10 where the vapor travels upward through water quench tower 10, and the liquid collects at the bottom of water quench tower 10. As the vapor flows up water quench tower 10, it is contacted by water supplied to water quench tower 10 via lines 24, 26, further cooling the vapor to an exit temperature of between about 15° C. and about 50° C. in the vapor product stream 28. In another embodiment, the exit temperature of the vapor product stream 28 can be from about 30° C. to about 40° C. The absolute pressure of vapor product stream 28 can be between about 0.1 MPa and about 0.5 MPa. In another embodiment, the absolute pressure of vapor product stream 28 can be between about 0.15 MPa and about 0.4 MPa.

A fraction of the heavier hydrocarbons and steam present in pyrolysis furnace effluent 16 condenses during the partial quenching. Steam and additional heavy hydrocarbons condense in water quench tower 10 as they are contacted and cooled by the water supplied to water quench tower 10 via lines 24, 26. The condensate collects in the bottom of water quench tower 10 and is transferred to oil-water separator 12 through condensate transfer line 30. The temperature of the condensed hydrocarbons and water exiting the bottom of water quench tower 10 in stream 30 can be between about 60° C. and about 110° C. In another embodiment, the temperature of the bottoms liquid from water quench tower 10 can be from about 80° C. to about 90° C.

Oil-water separator 12 gravity separates the condensate into hydrocarbon and water phases. The hydrocarbons can be recovered via line 32; the aqueous phase can be recovered via line 34 and if desired used as a process heating source in the conventional manner; and quench water can be recycled via line 36. Any heavy hydrocarbons or sediment that collects in separator 12 can be recovered via line 38.

Quench water in line 36 can be cooled in one or more heat exchangers 14a, 14b, and supplied to the water quench tower 10 and water quench fitting 20 through lines 18, 24, and 26, as needed to control the operation of the process. The quench water in line 36 can be cooled in heat exchangers 14a, 14b to a temperature of between about 15° C. and about 70° C. for supply in lines 18 and 24. In another embodiment, the quench water line 36 can be cooled to a temperature of between about 30° C. and about 40° C. If desired, one or more quench water lines 26 can supply quench water to line 18 or from another source to water quench tower 10, where the water in line 26 can be at a temperature intermediate of quench water line 24 and the quench water from the oil-water separator 12. Although illustrated as two separate pieces of equipment, oil-water separator 12 can be integrated into the bottom section of the quench tower 10. The quench water in lines 36, 18 may contain some oil, dissolved gases, other chemicals due to solubility, incomplete separation, etc., or any desired process additives.

Figure 2:
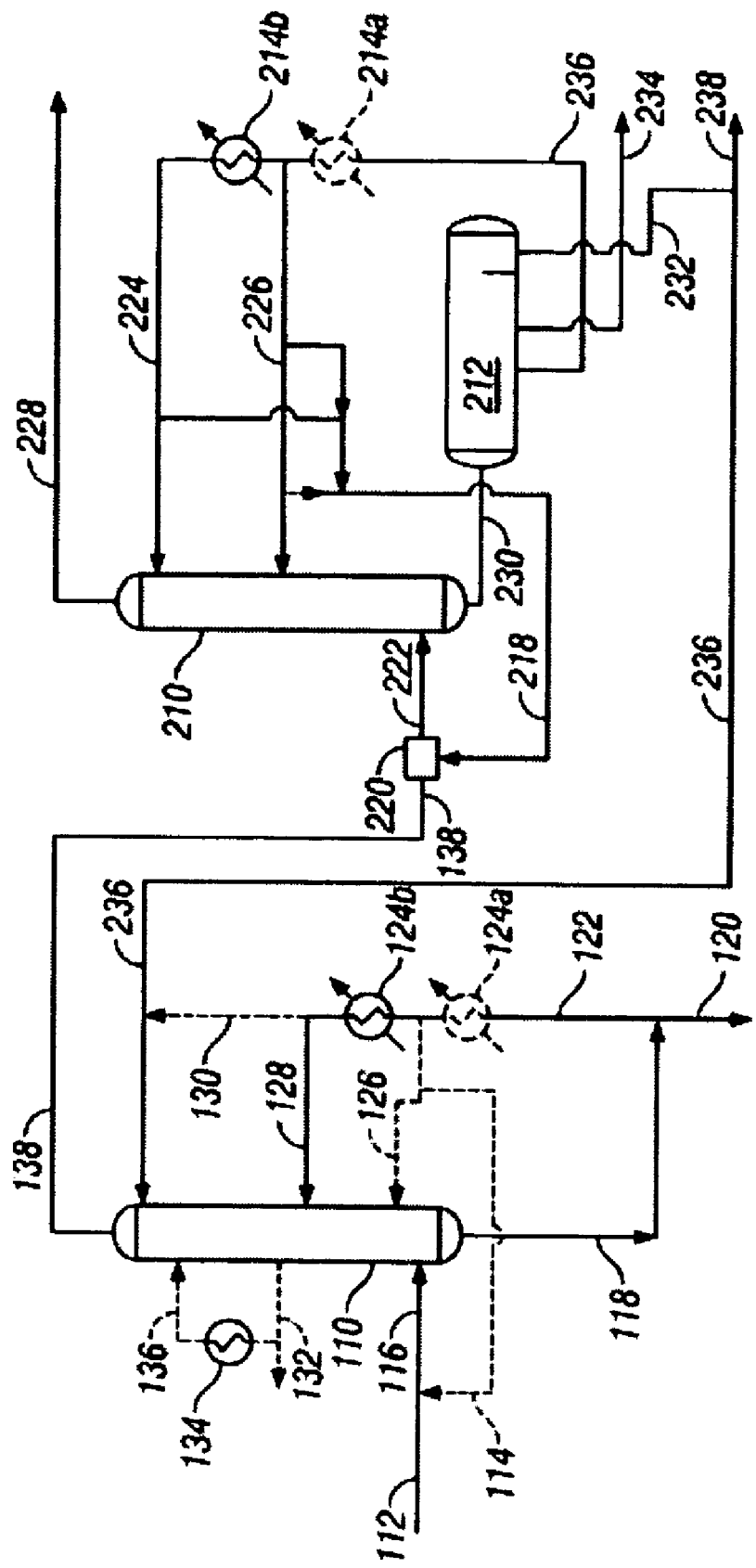
FIG. 2 depicts a simplified schematic illustration of a process for fractionating and water quenching a pyrolysis furnace effluent according to one embodiment.

FIG. 2 depicts a simplified schematic illustration of a process for fractionating and water quenching a pyrolysis furnace effluent according to one embodiment. Pyrolysis furnace effluent is supplied to fractionation tower 110 by line 112. Line 112 and line 114, if used, can supply line 116 feeding to fractionation tower 110. Liquid bottoms product from fractionation tower 110 is transmitted in line 118 for supply to lines 120 and 122. Line 120 can recover the heavy oil product and line 122 can supply oil to one or more heat exchangers 124a and 124b, operated in series or in parallel, and then to fractionation tower 110 via lines 126, 128, and 130. Lines 126 and 128 can optionally supply oil to line 114, if desired.

Fractionation tower 110 can have one or more side draws 132, and one or more circulating loops can provide cooling and reflux to the fractionation tower, such as through heat exchanger 134 and line 136. Overhead vapor product line 138 transmits vapor from fractionation tower 110 to a water quench system which in the embodiment of FIG. 2 includes water quench tower 210, oil-water separator 212, and one or more heat exchangers 214a, 214b. Water quench tower 210 contains vapor-liquid contacting elements or devices such as trays, mesh, fixed packing, random packing, liquid spray nozzles, or the like, which allow for contact of a vapor and a liquid in a countercurrent flow. Heat exchangers 214a and 214b can be fin-fan exchangers, shell and tube exchangers, plate exchangers, or other indirect heat exchangers well known in the art. Heat exchangers 214a and 214b can be operated in parallel or series configuration, and can include as many heat exchange units as are economical for specific plant operations.

Supply line 138 transmits hydrocarbons and steam, quench water line 218 transmits quench water, and the two streams are mixed in water quench fitting 220. Water quench fitting 220 can be an injection nozzle, a rotating nozzle, a mixing tee, a static mixer, or other well known equipment sufficient to adequately mix a vapor and a liquid stream upstream of the inlet to reduce the vapor traffic in the inlet water quench tower 210. Line 222 transmits the effluent from the water quench fitting 220 to quench tower 210. Lines 224 and 226 supply cooled water to water quench tower 210 and to quench water line 218. Overhead vapor product line 228 transmits vapor from water quench tower 210. Line 230 transmits the bottoms liquid to oil-water separator 212. Lines 232 and 234 allow recovery of hydrocarbons and water, respectively, from oil-water separator 212. Quench water is recovered from oil-water separator in line 236, which can supply the water to heat exchangers 214a and 214b to cool the fluid passing to lines 224 and 226.

The embodiment exampled in FIG. 2 can be operated to fractionate and water quench a liquid pyrolysis furnace effluent. For example, a pyrolysis furnace effluent 112, such as cracked naphtha, gas oil, or cracked kerosene, diluted with steam, and generally containing light, mid-range, and heavy hydrocarbons, exits the furnace and any indirect heat exchangers (not shown) and can be fed to fractionation tower 110 at a temperature of between about 350° C. and about 900° C., or between about 350° C. and about 550° C. Pyrolysis furnace effluent 112 can be oil quenched to a temperature between about 200° C. and about 300° C. by direct heat exchange with oil from line 114. The oil quenched effluent can be fed to fractionation tower 110 via line 116. In another embodiment, the pyrolysis furnace effluent 112 can be oil quenched to a temperature between about 235° C. and 300° C.

The fractionation tower 110 can condense and separate the heavier hydrocarbons from the light and mid-range hydrocarbons and any steam used to dilute the hydrocarbon in the pyrolysis furnace. The heavy hydrocarbons collected at the bottom of fractionation tower 110 can be used as quench oil or reflux for the fractionation tower 110. Fractionation tower 110 can be operated such that dilution steam in effluent 112 does not condense or collect in fractionation tower 110, i.e. above the boiling point of water. As the vapors flow up fractionation tower 110, they are contacted with liquid oil, further cooling the vapors to an exit temperature between about 90° C. and 300° C. in line 138. In an embodiment, the exit temperature of the vapor in line 138 can be between about 90° and 250° C., or between about 90° C. and 150° C.

The temperature of the condensed hydrocarbons exiting the bottom of fractionation tower 110 in line 118 can be between about 150° C. and about 300° C. The condensed hydrocarbons in line 118 are recovered in line 120. A portion of the condensed hydrocarbons can be supplied to line 122. Oil in line 122 can be cooled in one or more heat exchangers 124a, 124b, operating in series or in parallel, to a temperature between about 90° C. and about 300° C. in lines 126, 128, and 130. If desired, lines 126, 128 can supply oil to line 114 or can supply additional cool oil to the fractionation tower 110, where oil line 126 can be at a temperature intermediate that of line 128 and the bottoms from fractionation tower 110. The pyrolysis furnace effluent can be processed to produce overhead vapor product line 138 exiting the fractionation tower 110.

Overhead vapor product line 138, exiting the fractionation tower 110 at a temperature between about 90° C. and about 300° C., can be water quenched. Vapor from line 138 can be cooled to a temperature between about 70° C. and about 250° C. by direct heat exchange with quench water via line 218 in water quench fitting 220. The partially quenched stream in line 222 can be supplied to water quench tower 210. In another embodiment, vapor in line 138 can be cooled to a temperature between about 80° C. and about 100° C. by direct heat exchange with quench water from line 218 in water quench fitting 220.

The partially quenched vapor-liquid stream in line 222 can be fed to a lower end of water quench tower 210 where the vapor travels up and the liquid collects at the bottom. As the vapor flows up, the vapor is contacted by water from one or more cool water supply lines 224, 226, further cooling the vapors to an exit temperature of between about 15° C. and about 50° C. in line 228. In another embodiment, the exit temperature of the vapor can be from about 30° C. to about 40° C. The absolute pressure of water quench tower 210 at line 228 can be between about 0.1 MPa and about 0.5 MPa. In another embodiment, the absolute pressure at line 228 can be between about 0.15 MPa and about 0.4 MPa.

A fraction of the heavier hydrocarbons and steam present in pyrolysis furnace effluent 216 condenses during the partial quench. Steam and additional heavy hydrocarbons condense in water quench tower 210 as they are contacted and cooled by the water supplied to water quench tower 210 through lines 224, 226. The condensate collects in the bottom of water quench tower 210 and is transferred to oil-water separator 212 through condensate transfer line 230. The temperature of the bottoms liquid from quench tower 210 in stream 230 can be between about 60° C. and about 110° C. In another embodiment, the temperature of the bottoms liquid can be from about 80° C. to about 90° C.

Oil-water separator 212 separates the condensate into hydrocarbon and water phases. The hydrocarbons can be recovered in line 232. The aqueous phase can be recovered via line 234 and if desired used as a process heating source in the conventional manner. Quench water can be recycled via line 236. Quench water stream 236 can be cooled in one or more heat exchangers 214a, 214b, and supplied to the water quench tower 210 and water quench fitting 220 through lines 218, 224, and 226, as needed to control the operation of the process. The quench water stream 236 recovered from the oil-water separator 212 can be cooled in heat exchangers 214a, 214b to a temperature of between about 10° C. and about 70° C. for use as cool water supply in streams 218 and 224. In another embodiment, the quench water stream 236 can be cooled to a temperature of between about 30° C. to about 40° C. One or more quench water streams 226 can supply quench water stream 218 or can supply additional quench water to water quench tower 210, where water stream 226 can be at a temperature intermediate of quench water stream 224 and the temperature of the quench water in the oil-water separator 212. The condensed hydrocarbons are recovered from oil-water separator 212 via gasoline stream 232. A portion of the gasoline recovered in stream 232 can, if desired, be used to reflux the top of fractionation tower 110 via line 237; the remainder of the gasoline can be recovered via gasoline stream 238.

The energy balance surrounding the water quench tower and auxiliary equipment remains the same with or without a partial quench step included in the process. As a result, there are many benefits to using the partial quench step in the process. A primary benefit can be in the sizing requirements for the water quench tower. By use of a partial water quench upstream of the water quench tower, the capacity of an existing quench tower can be increased substantially. The design diameter for a new water quench tower can be significantly decreased. The capacity increase or design diameter decrease can be achieved by using a partial water quenching step to decrease the net vapor traffic at the bottom of the water quench tower. Use of a water quench fitting can reduce fouling by removing most of the coke or solids from the vapor before the vapor is contacted with liquid on the contacting surfaces in the water quench tower.

For the prior art process without a partial water quenching step, the design diameter of a water quench tower is generally controlled by the amount of steam required during the furnace de-coking process. With a partial water quench upstream of the water quench tower as in the present invention, steam flow rates during the de-coking process are no longer the controlling factor in the design process because the partial quench upstream of the water quench tower can condense this extra steam, thereby decreasing the net vapor traffic in the water quench tower, and decreasing the required diameter during the de-coking process.

The use of a partial water quenching step can also improve the versatility of the overall process. For processes currently limited to a particular feedstock hydrocarbon due to additional vapor traffic requirements when other feedstock hydrocarbons are used, the use of a partial water quenching step can decrease the vapor traffic reaching the water quench tower, thereby allowing use of a broader range of feedstock hydrocarbons, improving the versatility of the process.

The benefits outlined above will become more apparent in the examples given below.

Table 1 gives a comparison of simulation results for a water quench process similar to that as illustrated in FIG. 1. A comparison of simulation results are given for processes with and without water quenching in a water quench fitting 20 upstream of the water quench tower 10, where the pyrolysis furnace effluent 16 is from an ethane/propane cracker, having a steam to hydrocarbon feed ratio of 0.3 based on weight. An additional comparison is given for the same pyrolysis furnace effluent 16 having an additional 20 metric tons per hour of de-coking steam. For each comparison, the water quench tower 10 has an equivalent number of stages, such that a comparison of design diameter decrease or capacity increase based upon tower volume can be made. The overhead vapor product in line 28 is approximately equivalent for each comparison, indicating that side-by-side comparison of the simulation results can be performed without misleading results. The limiting design factors are liquid flooding and net vapor traffic at the bottom of water quench tower 10.

TABLE 1

Water quench for E/P cracker effluent.

| | | Stream or Unit | | | | Quench tower pressure (kg/sq cm) | Resulting Quench tower diameter (m) |
|---|---|---|---|---|---|---|---|
| | | 16 | 18 | 24 | 28 | 10 | 10 |
| Comp. 1 | Flow rate (tonnes/h) | 169 | 0 | 870 | 136 | | |
| | Temperature (° C.) | 250 | N/A | 38 | 39 | 1.41 | 3.97 |
| Comp. 2 | Flow rate (tonnes/h) | 189 | 0 | 1173 | 135 | | |
| | Temperature (° C.) | 250 | N/A | 38 | 38.4 | 1.41 | 4.3 |
| Ex. 1 | Flow rate (tonnes/h) | 169 | 200 | 660 | 136 | | |
| | Temperature (° C.) | 250 | 38 | 38 | 41.3 | 1.41 | 3.7 |
| Ex. 2 | Flow rate (tonnes/h) | 189 | 504 | 660 | 136 | | |
| | Temperature (° C.) | 250 | 38 | 38 | 40.8 | 1.41 | 3.7 |
| Ex. 3 | Flow rate (tonnes/h) | 169 | 600 | 300 | 132 | | |
| | Temperature (° C.) | 250 | 38 | 38 | 40.2 | 3.41 | 2.6 |

Comparative examples 1 and 2 provide the design basis for water quench tower 10 without using the partial water quench 18 upstream of the water quench tower 10. Comparative example 1 illustrates conditions for design of a water quench tower 10 under normal operating conditions, and Comparative Example 2 illustrates design for operations during de-coking, with an additional 20 tonnes per hour of steam added to the pyrolysis furnace effluent 16. As can be seen in Table 1, the design diameter of the resulting water quench tower 10 should be based upon de-coking, 4.3 m. By comparison, Example 1, normal operating conditions with a partial quench stream 18, and Example 2, de-coking conditions with a partial quench stream 18, illustrate the decrease in design diameter that can be achieved by utilizing partial quench water stream 18. The total combined amount of quench water used in quench water streams 18, 24, and 26 remains constant for the same rate of pyrolysis furnace effluent 16, illustrative of the equivalence of the energy balance, as mentioned earlier. The resulting design diameter decreases to 3.7 m, and the design diameter is no longer limited by de-coking, when a water quench fitting 20 is added to the process. The simulation results indicate a 14% decrease in design diameter, or, an existing tower can process an additional 35% more cracked gas when retrofitted to perform a partial quench, based on diameter.

Example 3 in Table 1 illustrates an additional benefit that can be realized by operating the water quench tower 10 at a slightly elevated pressure. By increasing the pressure in the water quench tower 10 from 0.14 MPa to 0.34 MPa, the design diameter can be decreased further, to 2.6 m. This correlates to nearly a 30% further decrease in tower diameter, or, an existing tower can handle twice the capacity of a tower operating at lower pressure, based on design diameter results.

TABLE 2

Water quench of a fractionator overhead product stream where the fractionator processed naphtha cracker effluent.

| | | Stream or Unit | | | | | Resulting Quench tower diameter (m) |
|---|---|---|---|---|---|---|---|
| | | 138 | 218 | 224 | 226 | 228 | 210 |
| Comp. 3 | Flow rate (tonnes/h) | 263.6 | 0 | 722.7 | 600 | 135.4 | |
| | Temperature (° C.) | 118.1 | N/A | 38 | 60 | 39.9 | 4.5 |
| Comp. 4 | Flow rate (tonnes/h) | 283.6 | 0 | 730 | 1080 | 135.2 | |
| | Temperature (° C.) | 112.7 | N/A | 38 | 60 | 39.4 | 4.8 |
| Ex. 4 | Flow rate (tonnes/h) | 263.6 | 600 | 730 | 0 | 135.5 | |
| | Temperature (° C.) | 117 | 60 | 38 | | 40.4 | 3.8 |
| Ex. 5 | Flow rate (tonnes/h) | 283.6 | 1060 | 730 | 0 | 135.5 | |
| | Temperature (° C.) | 113.9 | 60 | 38 | | 40.3 | 3.8 |

Table 2 gives a similar comparison of simulation results for a pyrolysis furnace effluent of cracked naphtha, with a steam to hydrocarbon ratio of 0.5 based on weight, where the pyrolysis furnace effluent is fractionated upstream of the water quench tower, similar to the process of FIG. 2. Comparative examples 3 and 4 give simulation results for the water quench tower 210, processing the overhead product 138 from a fractionation tower 110. Comparative example 3 is for normal operating conditions, and comparative example 4 is for de-coking conditions where an additional 20 tonnes/hour steam are employed. Design of a water quench tower 210 without use of a partial water quench fitting 220 is again limited based on de-coking, having a design diameter of 4.8 m. By comparison, Examples 4 and 5 illustrate that with the addition of a partial water quench fitting 220, the design diameter of water quench tower 210 is no longer limited based on de-coking, and the design diameter decreases to 3.8 m with use of water quench fitting 220. The simulation results indicate a potential design diameter decrease of 21%, or, the capacity of an existing water quench tower 210 can be increased by as much as 59% when retrofitted with water quenching fitting 220.

TABLE 3

Water quench of fractionator overheads where the fractionator processes a kerosene cracker effluent.

| | | Stream or Unit | | | | Resulting Quench tower diameter (m) |
|---|---|---|---|---|---|---|
| | | 138 | 218 | 224 | 228 | 210 |
| Comp. 5 | Flow rate (tonnes/h) | 324 | 0 | 1550 | 140.8 | |
| | Temperature (° C.) | 95 | N/A | 38 | 38.1 | 4.95 |
| Comp. 6 | Flow rate (tonnes/h) | 344 | 0 | 1815 | 142 | |
| | Temperature (° C.) | 95.9 | N/A | 38 | 40.2 | 5.19 |
| Ex. 6 | Flow rate (tonnes/h) | 324 | 770 | 790 | 143.2 | |
| | Temperature (° C.) | 97.5 | 38 | 38 | 41.1 | 3.98 |
| Ex. 7 | Flow rate (tonnes/h) | 344 | 1025 | 790 | 144.4 | |
| | Temperature (° C.) | 97.6 | 38 | 38 | 39.7 | 3.95 |

Table 3 again illustrates simulation results for a process similar to that of FIG. 2, except that the pyrolysis furnace effluent 112 is a cracked heavy hydrocarbon, such as kerosene, with a steam to hydrocarbon feed ratio of 0.6. The results again show a significant decrease in the design diameter of water quench tower 210, and again show that de-coking is no longer limiting on design diameter when a water quench fitting 220 is added to the process. The results for cracked kerosene indicate a decrease in design diameter of 23%, or, the capacity of an existing water quench tower 210 can be increased by approximately 70% when retrofitted with a water quench fitting 220.

As is illustrated in the above examples, addition of a partial water quench fitting upstream of the water quench tower can provide the benefits of additional capacity or a smaller design diameter. The additional capacity can improve the versatility of existing columns and can potentially allow the use of a wider range of feedstock hydrocarbons for pyrolysis furnace operation. The smaller design diameter can decrease capital costs associated with new construction. Column design limits based upon de-coking are also alleviated by use of a partial water quench upstream of the water quench tower. Additionally, use of a water quench fitting can reduce fouling by removing most of the coke or solids from the vapor before the vapor is contacted with liquid on the contacting surfaces in the water quench tower.

The embodiments herein can use a catalytic converter instead of a pyrolysis furnace.

While these embodiments have been described with emphasis on the embodiments, it should be understood that within the scope of the appended claims, the embodiments might be practiced other than as specifically described herein.

What is claimed is:

1. A process for water quenching a pyrolysis furnace effluent, comprising:

partially quenching a hydrocarbon stream comprising gas and oil vapor with a first quench water stream to form a mixed vapor-liquid stream;

feeding the mixed vapor-liquid stream to a water quench tower to separate the vapor and liquid;

further quenching the separated vapor with a second quench water stream in the quench tower to form an overhead vapor product comprising light hydrocarbons;

collecting water and liquid hydrocarbons from the quench tower in an oil-water separator;

recovering the liquid hydrocarbons from the oil-water separator;

recovering water from the oil-water separator;

cooling a portion of the recovered water; and recycling the cooled water to the first and second quench water streams.

2. The process of claim 1 wherein the hydrocarbon stream comprises pyrolysis furnace effluent from a gas cracker.

3. The process of claim 1 wherein the partially quenched hydrocarbon stream is fed to a lower end of the water quench tower below a lowermost vapor-liquid contact element.

4. The process of claim 1 wherein the cooling includes indirect heat exchange.

5. The process of claim 1 wherein the hydrocarbon stream comprises liquid cracker effluent processed by upstream fractionation by feeding the effluent to a fractionation tower system and quenching vapor in the fractionation tower system with a first quench oil stream to form the hydrocarbon stream for the partial water quenching.

6. The process of claim 5 further comprising:
collecting liquid hydrocarbons from the fractionation tower system;
recovering a first portion of the collected liquid hydrocarbons from the fractionation tower system;
cooling a second portion of the collected liquid hydrocarbons from the fractionation tower system; and
recycling at least part of the cooled portion to the first quench oil stream.

7. The process of claim 6 further comprising partially quenching the effluent with a second quench oil stream comprising part of the cooled portion in a feed line to form a mixed vapor-liquid hydrocarbon stream for the feed to the fractionation tower system.

8. The process of claim 7 further comprising refluxing the fractionation tower system with at least a portion of the liquid hydrocarbon recovered from the oil-water separator.

9. The process of claim 5 wherein the liquid cracker effluent comprises a member selected from the group consisting of cracked naphtha, cracked kerosene, or combinations thereof.

10. An apparatus for water quenching a pyrolysis furnace effluent, comprising:
means for partially quenching a hydrocarbon stream comprising gas and oil vapor with a first quench water stream to form a mixed vapor-liquid stream;
means for separating the vapor and liquid;
means for quenching the separated vapor with a second quench water stream to form an overhead vapor product comprising light hydrocarbons;
means for collecting the water and liquid hydrocarbons;
means for separating the oil from the water;
means for recovering the separated water;
means for cooling at least a portion of the recovered water; and
means for recycling the cooled water to the first and second quench water streams.

11. A process for quenching a pyrolysis furnace effluent, comprising:
quenching a hydrocarbon comprising gas and oil vapor to provide a first liquid phase comprising water and liquid hydrocarbons and a gas phase comprising the oil vapor;
separating at least a portion of the first liquid phase from the gas phase;
quenching the separated gas phase to provide a second liquid phase comprising water and liquid hydrocarbons;
collecting the first and second liquid phases;
separating at least a portion of the water from the first and second liquid phases;
cooling at least a portion of the water;
using at least a portion of the cooled water to quench the hydrocarbon; and
using at least a portion of the cooled water to quench the separated gas phase.

12. The process of claim 11 wherein the hydrocarbon has a steam to hydrocarbon feed weight ratio of about 0.2 to about 1.0.

13. The process of claim 11 wherein the partially quenched hydrocarbon has a temperature of about 65° C. to about 125° C.

14. The process of claim 11 wherein the hydrocarbon prior to the partial quenching has a temperature greater than or equal to 175° C.

15. The process of claim 11 wherein the hydrocarbon comprises liquid cracker effluent.

16. The process of claim 15 wherein the liquid cracker effluent comprises cracked naphtha, cracked kerosene, or both.

17. The process of claim 11 wherein the quenched separated gas phase has a temperature of about 15° C. to about 50° C.

18. The process of claim 11 wherein the collected first and second liquid phase have a temperature of about 60° C. to about 110° C.

19. The process of claim 11 wherein cooling at least a portion of the water comprises indirect heat exchange.

20. The process of claim 11 wherein quenching the hydrocarbon comprises contacting the hydrocarbon with water having a temperature of about 15° C. to about 70° C.

* * * * *